(12) United States Patent
Salber et al.

(10) Patent No.: US 6,701,887 B2
(45) Date of Patent: Mar. 9, 2004

(54) METHOD FOR INFLUENCING THE MIXTURE FORMATION AND CHARGING MOVEMENT IN A CYLINDER OF A PISTON INTERNAL COMBUSTION ENGINE WITH EXTERNALLY APPLIED IGNITION

(75) Inventors: Wolfgang Salber, Aachen (DE); Thomas Esch, Aachen (DE)

(73) Assignee: FEV Motorentechnik GmbH, Aachen (DE)

(*) Notice: Subject to any disclaimer, the term of this patent is extended or adjusted under 35 U.S.C. 154(b) by 0 days.

(21) Appl. No.: 10/018,684

(22) PCT Filed: Apr. 14, 2001

(86) PCT No.: PCT/EP01/04272
§ 371 (c)(1), (2), (4) Date: Apr. 22, 2002

(87) PCT Pub. No.: WO01/81745
PCT Pub. Date: Nov. 1, 2001

(65) Prior Publication Data
US 2002/0134348 A1 Sep. 26, 2002

(51) Int. Cl.⁷ .................................................. F02B 75/02
(52) U.S. Cl. ...................................... 123/315; 123/90.11
(58) Field of Search ............................. 123/315, 90.11, 123/90.15, 90.65; 251/129.18, 129.16

(56) References Cited

U.S. PATENT DOCUMENTS

| | | |
|---|---|---|
| 4,722,315 A | 2/1988 | Pickel |
| 5,996,539 A | 12/1999 | Göbel et al. |
| 6,055,948 A | 5/2000 | Shiraishi et al. |

FOREIGN PATENT DOCUMENTS

| | | |
|---|---|---|
| DE | 31 41 663 | 5/1983 |
| DE | 43 08 932 | 9/1994 |
| DE | 196 10 468 | 2/1997 |
| DE | 197 33 139 | 2/1999 |
| EP | 0 367 553 | 5/1990 |
| FR | 2 796 418 | 1/2001 |
| JP | 05263671 | 10/1993 |
| WO | 97/13063 | 4/1997 |

*Primary Examiner*—Tony M. Argenbright
*Assistant Examiner*—Katrina B. Harris
(74) *Attorney, Agent, or Firm*—Venable LLP; Norman N. Kunitz

(57) ABSTRACT

A method of influencing the mixture formation and charge movement in the cylinders of a piston internal combustion engine, having at least one gas intake valve and at least one gas outlet valve per cylinder. Each of the valves is provided with a fully variable, preferably electrimagnetic, valve drive and is controllable via an electronic control device that is configured such that within predetermined speed ranges and/or for predetermined load conditions, at least some of the gas intake valves and/or the gas outlet valves can be moved, respectively in dependence on the piston stroke, with a stroke course that is variable, relative to the opening and closing moments and/or the opening time, the opening width and/or the opening duration and/or the movement speed.

12 Claims, 4 Drawing Sheets

METHOD FOR INFLUENCING THE MIXTURE FORMATION AND CHARGING MOVEMENT IN A CYLINDER OF A PISTON INTERNAL COMBUSTION ENGINE WITH EXTERNALLY APPLIED IGNITION

BACKGROUND OF THE INVENTION

For influencing the mixture formation and charge movement in cylinders of piston internal combustion engines with external auto-ignition, it is known from reference WO 91/14858 to provide means in the intake valve region, which permit a controlled deflection of the flow from the intake area, through the intake opening and into the cylinder. This deflection is intended to improve the poor fuel evaporation resulting from insufficient mixture formation due to a lack of negative pressure in the suction pipe. Sliding valves, butterfly valves, swivel nozzles or the like, arranged in the area directly adjacent to the intake opening, are suggested as means for deflecting the flow. These elements are actuated with respective adjusting means and via a control device, in dependence on the operating state of the motor. For specific operating states, the flow of the fuel-air-mixture flowing through the channel-type intake, henceforth also called gas flow, is deflected through a deflection and speed increase, such that a defined flow, for example a so-called tumble flow, forms inside the cylinder chamber during the intake stroke. The rotational axis of this flow essentially extends crosswise to the cylinder axis. The disadvantage of this arrangement is that the actuation means are positioned in the intake area, directly in front of the intake opening, meaning in a region having already limited space for additional components.

The reference DE-A-197 33 139 discloses the use of an electromagnetic actuator for opening and/or closing a gas intake valve in two opening stages. For this, the actuator is provided with an additional magnet that makes it possible to open the valve even with a minimum stroke. However, no measures for influencing the flow conditions are provided besides the influencing of the opening times since this actuator can only actuate the "open" and "closed" position of the gas intake valve and only for two opening widths.

SUMMARY OF THE INVENTION

Thus, it is the object of the invention to create a method, which influences the mixture formation and the charge movement by actuating the valve drives via a control device for different load conditions, in particular at low speeds and/or for a small load.

This object is solved according to the invention with a method of influencing the mixture formation and charge movement in the cylinders of a piston internal combustion engine, having at least one gas intake valve and at least one gas outlet valve per cylinder, which are each provided with a fully variable, preferably electromagnetic valve drive and can be actuated via an electronic control device that is configured such that at predetermined speed ranges and/or for predetermined load conditions, at least some of the gas intake valves and/or the gas outlet valves can be moved, respectively in dependence on the piston stroke, with a changeable stroke course, relative to the opening and closing moments and/or the opening time, the opening width and/or the opening duration and/or the movement speed. By purposely influencing the stroke course in this way, it is possible to optimally adapt the mixture preparation and the charge movement to the requirements of the respective load case.

For example, the combustion chamber can be filled with a more highly processed fresh mixture by initially opening up only to a small valve cross section and subsequently opening up to a larger valve cross section, which may still be smaller than the full cross section. During the first phase of the stroke movement, the fuel-air-mixture flows with a high flow speed through the only slightly opened cross-sectional area of the valve and into the combustion chamber. The preparation and homogenization of the mixture is thus positively reinforced. A constant, small cross-sectional valve opening is actuated only for the no-load condition. The same is true for piston internal combustion engines with direct fuel injection into the cylinder, for which a flow guidance of the air filling is provided instead of the suctioned-in fresh mixture. The required charge amount for displaying a desired partial load point is ensured in that following a slight or even slow opening of the valve at the start of the opening phase, the valve is subsequently controlled to open up further. Thus, the combustion chamber is filled to an optimum level with fresh mixture for the given load point. Since the stroke course for the gas intake valve can be actuated fully variable via the electromagnetic valve drive and with the electronic control device, the stroke course for the reversing valves (gas intake valve and/or gas outlet valve) can be "formed" in dependence on the piston stroke with respect to the opening width and/or the opening duration and/or the movement speed. By varying these parameters, it is possible to optimize the flow conditions upon entering the combustion chamber and inside the combustion chamber.

The method can be modified in different ways. For example, it is possible to open the gas intake valve only briefly and slightly and with increasing movement speed at the start of the valve-opening time. Subsequently, the valve is closed again with high movement speed and, following this, opened once more to a larger cross section. As a result, a movement is excited in the cylinder chamber with a first, low mixture filling and increasing vacuum pressure. Thus, if a larger valve cross-sectional area is subsequently opened up due to the increased vacuum pressure in the cylinder and the dynamic pressure in the gas intake channel in front of the gas intake valve, the charge amount can flow with high speed into the cylinder.

On the other hand, following an initial opening of a larger valve cross section, it is also possible to reduce the gas intake valve at first back to a smaller cross-sectional area and then close it completely. This mode of operation again allows a residual amount of fresh gas to flow at high speed into the cylinder near the end of the opening time, thereby favorably influencing the charge movement in the cylinder during the intake stroke, preferably toward the end of the intake stroke. The stroke course in this case can also be "formed" through an optimum adaptation to different load points, by means of a corresponding programming of the control device. Different performance characteristics can be specified for all load cases under consideration.

The above-described different modes of operation can be optionally combined, depending on the load requirements. For internal combustion engines provided with several gas-intake valves for each cylinder, all gas-intake valves or only one gas intake valve of the respective cylinder can also be actuated in this way.

BRIEF DESCRIPTION OF THE DRAWINGS

The invention is explained in further detail with the aid of schematic drawings, which show in.

Figure 1:
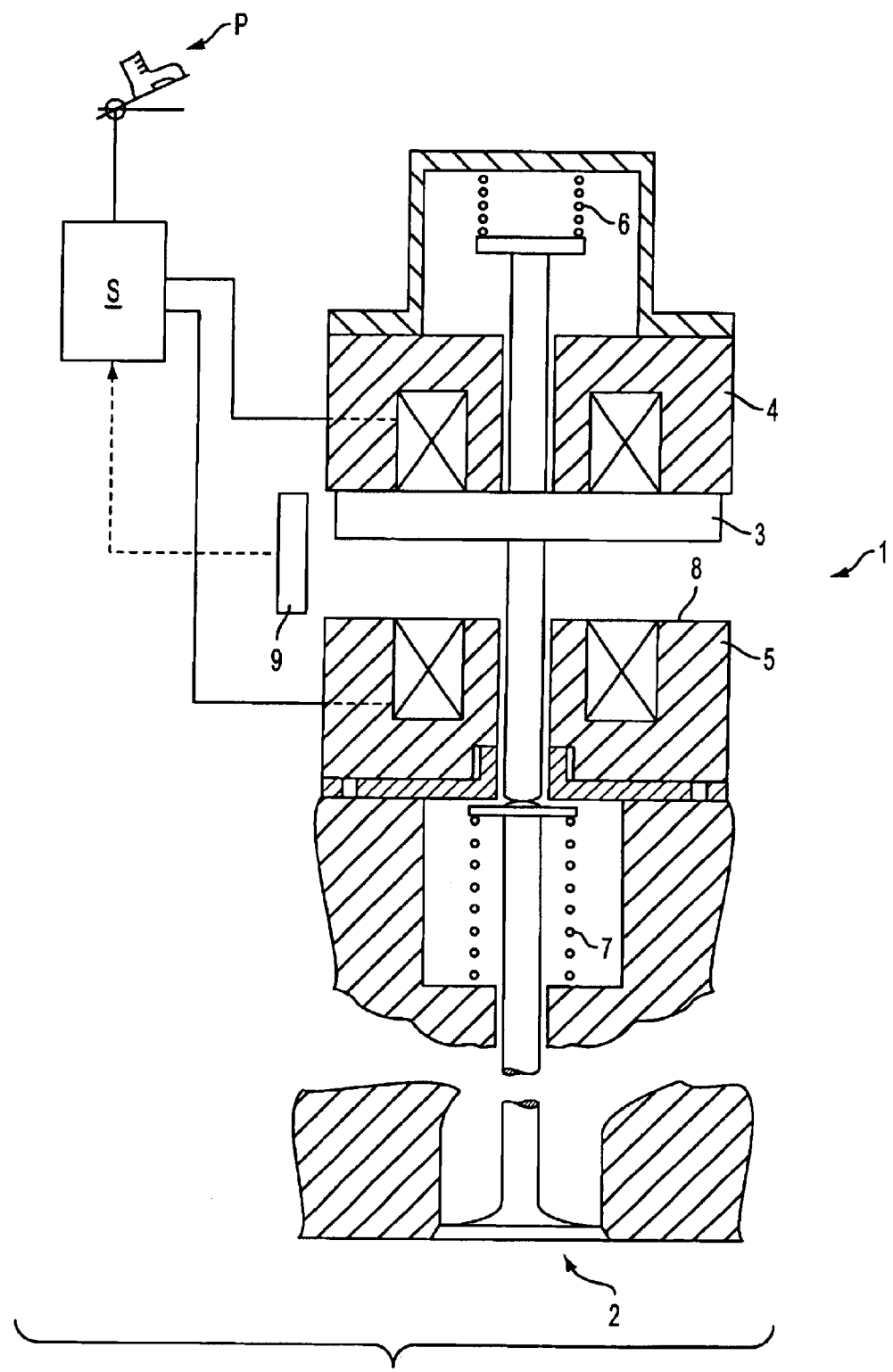
FIG. 1 An exemplary embodiment of an electromagnetic actuator for actuating a reversing valve.

The exemplary embodiment in FIG. 1 is an electromagnetic actuator 1, which is operatively connected to a gas-reversing valve 2. The electromagnetic actuator 1 is provided with an armature 3, to which a closing magnet 4 and an opening magnet 5 are assigned. The two magnets are connected to an electronic control device S. Thus, if the current is controlled so as to be supplied alternately to the armature 3, the armature can be moved back and forth between the two magnets 4 and 5, counter to the restoring force of an opening spring 6 and a closing spring 7. If fully under current, the armature 3 occupies the respectively adjusted position by fitting against the pole surface 8 of the respective magnet. The two restoring springs 6 and 7 for the exemplary embodiment shown herein have identical designs, so that if the electromagnets are not under current, the resting position of the armature 3 is in the center between the two pole surfaces.

If current is supplied to the closing magnet 4, as shown in FIG. 1, the armature 3 rests against the pole surface of the closing magnet 4 and keeps the intake valve 2 in the closed position. Once the current to the closing magnet 4 is turned off, the armature together with the gas intake valve is moved by the force of the opening spring 6 counter to the increasing force of the closing spring 7 in the direction toward the opening magnet 5. If the opening magnet is supplied with current at a controllable point in time when the armature 3 moves past the aforementioned resting position, then a corresponding magnetic field is generated, which "catches" the armature 3. The armature is moved counter to the increasing force of the closing spring 7 until it comes to rest against the pole surface 8 of the opening magnet 5. Following an opening moment that is predetermined by the control device, the current to the opening magnet 5 is shut down and current is supplied to the closing magnet. Thus, the armature 3 again moves to the closing position shown in FIG. 7 and the gas intake is closed once more. This "normal" stroke course corresponds to the stroke course for the full load, shown in FIG. 2. The stroke course is controlled via the control device S and in accordance with the load specified by the driver (pedal P).

Figure 2:
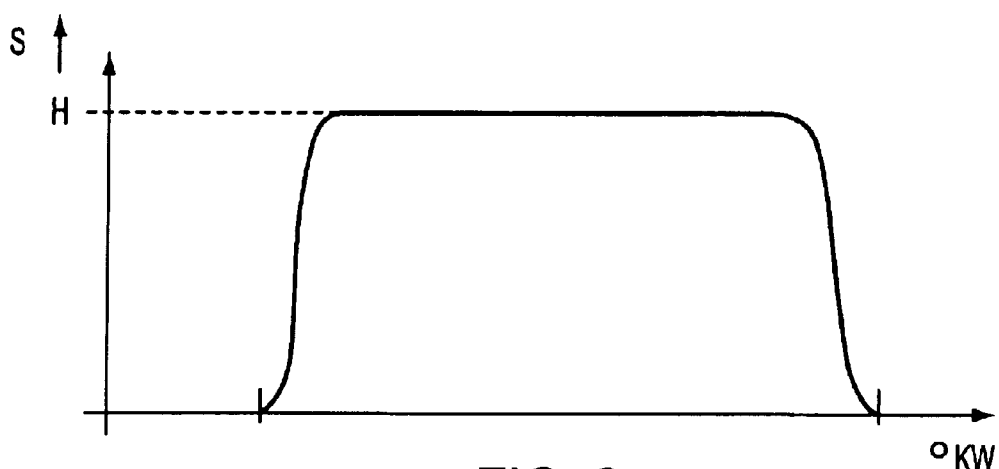
FIG. 2 The stroke course of a gas intake valve in dependence on the piston stroke (degree crankshaft angle) during the full-load operation.

With the "normal" stroke course shown in FIG. 2, for example the stroke course in the upper load range and/or at high speeds, the gas-reversing valve opens for a predetermined opening interval in accordance with specified control values and at high movement speed to its full stroke H. Gas can thus flow through the fully opened valve cross section into the combustion chamber. Following that, the gas intake valve is again closed completely. However, an optimum mixture preparation cannot be achieved with a stroke course of this type, in particular in the partial-load range or for the no-load operation of Otto engines.

The control device S is configured such that depending on the desired load and, if necessary, using the stored characteristic performance values, the armature movement and thus also the valve movement can be influenced by guiding the current supply to the electromagnet, so as to "form" the stroke course of the gas intake valve 2. The path, the respective position and also the respective speed of armature 3 can be detected with a sensor arrangement 9 that is only indicated herein and can be considered for the stroke-course formation in the control device S. The detected values can be measured in the armature region or at the guide rod connected to the armature. However, these values can also be detected by recording the current and/or voltage course in the control device.

The differently formed stroke courses, shown schematically in the following, are only intended to show to what degree the stroke course and thus also the flow inside the cylinder can be influenced with a correspondingly designed control device.

Figure 3:
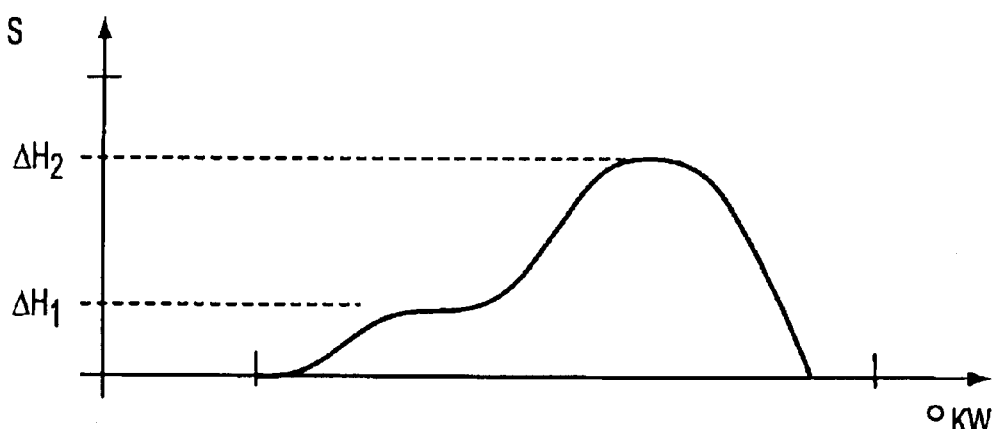
FIG. 3 A formed stroke course with small stroke opening at the start of the opening stroke.

If the gas intake valve is opened with slow movement speed and only a short stroke $\Delta H_1$ at the beginning of the intake stroke, as shown in FIG. 3, the negative pressure that builds up will cause the gas to flow with high speed through the small flow cross section opened up by the gas intake valve and into the combustion chamber. Thus, if the gas intake valve opens further to $\Delta H_1$, the combustion chamber receives the full filling amount, wherein the mixture preparation and the charge movement are improved due to the eddy flow induced at the start. With the stroke course shown herein, the gas intake valve is actuated in such a way that it does not open fully. That is to say, the armature 3 approaches the opening magnet 5 in a so-called free flight, but does not come to rest against its pole surface 8 because the control device S shuts down the current supplied to the opening magnet 5 correspondingly early. Depending on the specific requirements, the closing magnet 4 may already be under current.

Thus, practically any stroke course can be formed and actuated with respect to opening speed, opening width and duration of the different opening widths by controlling the current supply with the control device S, as shown in FIG. 3.

Figure 4:
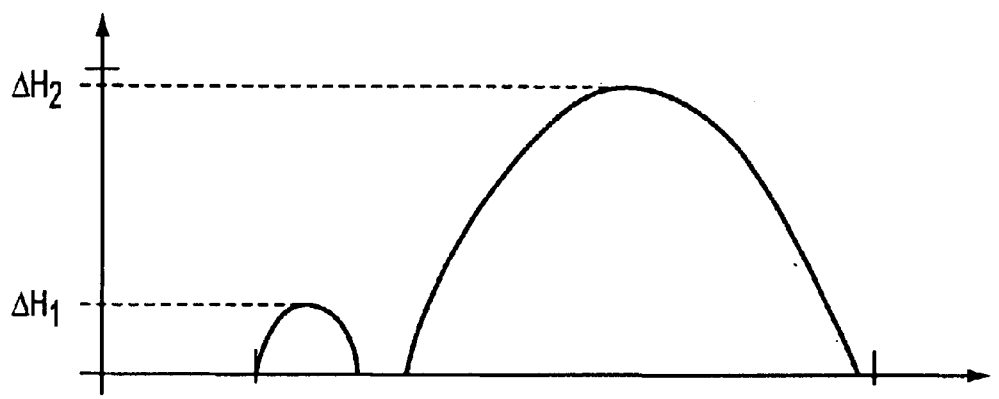
FIG. 4 A formed stroke course with a short-term, separate opening stroke at the start of the stroke course and a subsequent, full stroke.

FIG. 4 shows that a similar effect can be achieved if the valve opens up with only a slight stroke $\Delta H_1$ at the start of the opening stroke, then closes again and subsequently opens up again quickly to the full opening cross section, but is not captured by the opening magnet 5. Since the cylinder piston continues to move during the brief closing time between the two opening strokes, the negative pressure in the combustion chamber increases in the meantime, so that the remaining gas flow can flow jerkily and with correspondingly increased speed into the combustion chamber. This stroke course can also take place in the reversed sequence. That is to say, the valve is initially opened fully and closed prematurely, which is followed by a "short stroke." In both cases, the current supply can also be controlled in such a way that the gas reversing valve, the intake valve in this case, is kept open briefly.

Figure 5:
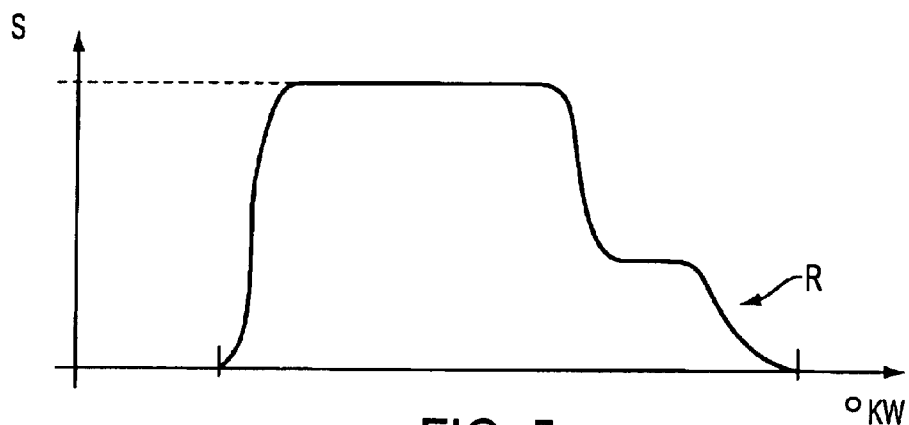
FIG. 5 A stroke course with full valve opening cross section at the start of the stroke and reduced opening cross section at the end of the stroke.
Figure 6:
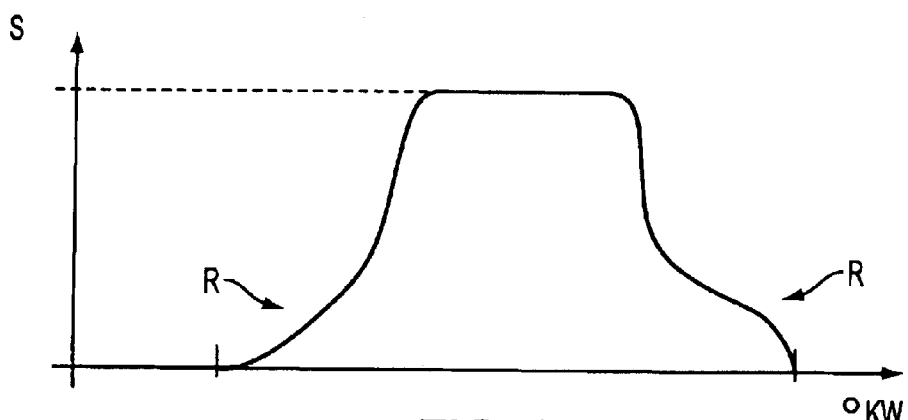
FIG. 6 A stroke course where the opening is slowed down and the closing is accelerated.

The stroke courses shown in FIGS. 5 and 6 represent differently formed and modified stroke courses, based on values specified by the control device, with differently formed ramps R for the opening and closing movements. These stroke courses permit the gas to flow once more with high speed into the combustion chamber at the end of the intake stroke. The flow inside the cylinder, which slows down during the downward movement of the piston, can again accelerate and is thus stabilized.

The above-described examples of stroke courses can be used with piston internal combustion engines having only one gas intake valve per cylinder and one gas outlet valve per cylinder, as well as with piston internal combustion engines having two or more gas intake valves and/or two or more gas outlet valves per cylinder.

With two gas intake valves per cylinder, both or only one gas intake valve can be actuated with a formed stroke course. It is also possible to keep one gas intake valve closed and actuate the other gas intake valve in this manner. It is advantageous in this connection if the two gas intake valves are alternated during longer operating periods.

If one gas intake valve in an arrangement of two gas intake valves per cylinder is closed over a longer period of time, it must be opened briefly during each intake stroke or even periodically, following a sequence of several operating cycles to "suction off" the accumulated fuel in front of the valve.

Figures 7, 10:
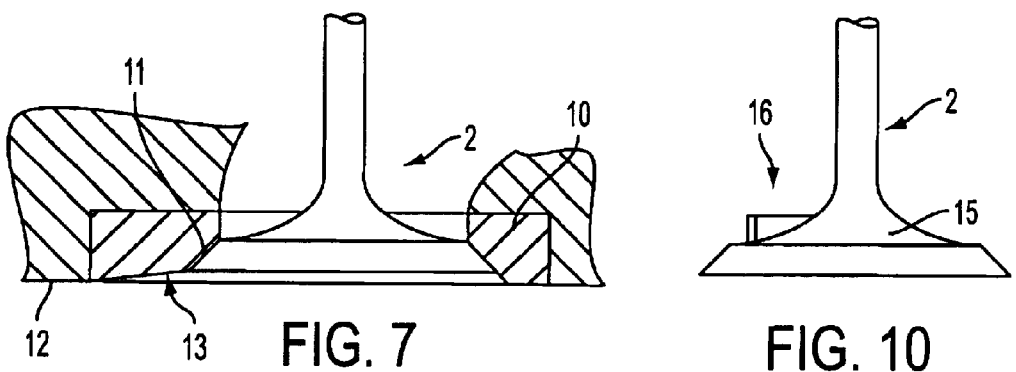
FIG. 7 A sectional view of a valve-seat ring with guide means.
FIG. 10 A gas intake valve with guide means, as seen from the side.

The sectional view in FIG. 7 shows an embodiment of a valve seat for the gas-reversing valve 2. A valve seat ring 10 with a valve seat edge 11 that is somewhat recessed from the combustion chamber roof 12 is assigned to the gas-reversing valve 2. On the side facing the combustion chamber, the valve-seat ring 10 is provided with a notched out section 13 over a portion of its circumference, which functions as guide means for the gas flow. This notched out section 13 is located on the side of valve-seat ring 10 that faces the cylinder axis and is oriented in such a way that depending on the desired cylinder flow (twisted or tumble), the intake opening that is restricted by the valve-seat ring is correspondingly oriented and extends in circumferential direction, as shown in FIGS. 8 and 9.

If the gas-reversing valve 2 is opened with only a minimum stroke, then the intake opening is initially opened only in the region of the notched out section 13. In contrast, the opposite side is still screened by the valve-seat ring 10, so that the incoming gas flow can enter the combustion chamber with a defined orientation. On the other hand, if the gas reversing valve is opened fully, the notched out section 13 has virtually no effect on the gas flow, so that the gas can flow into the combustion chamber essentially with the orientation provided by the movement axis of the gas reversing valve.

Figure 8:
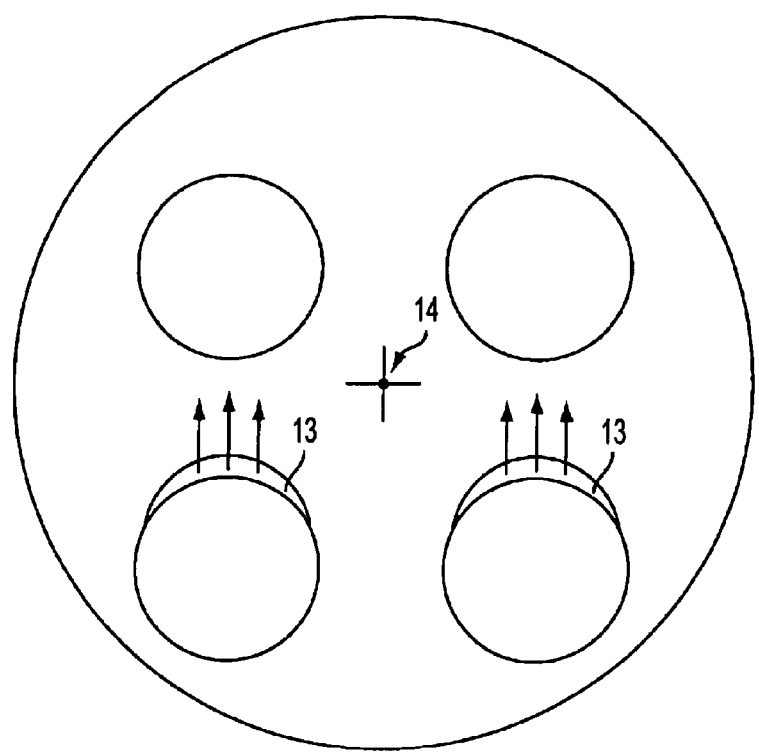
FIG. 8 A schematic view of the arrangement of the valve-seat rings according to FIG. 7 for generating a tumble flow.

Depending on the orientation of the notched out section 13 and parallel alignment inside the combustion chamber, a tumble flow can be induced in the direction toward the cylinder axis 14 in piston internal combustion engines having two gas intake valves, as shown with the view toward the chamber roof in FIG. 8.

Figure 9:
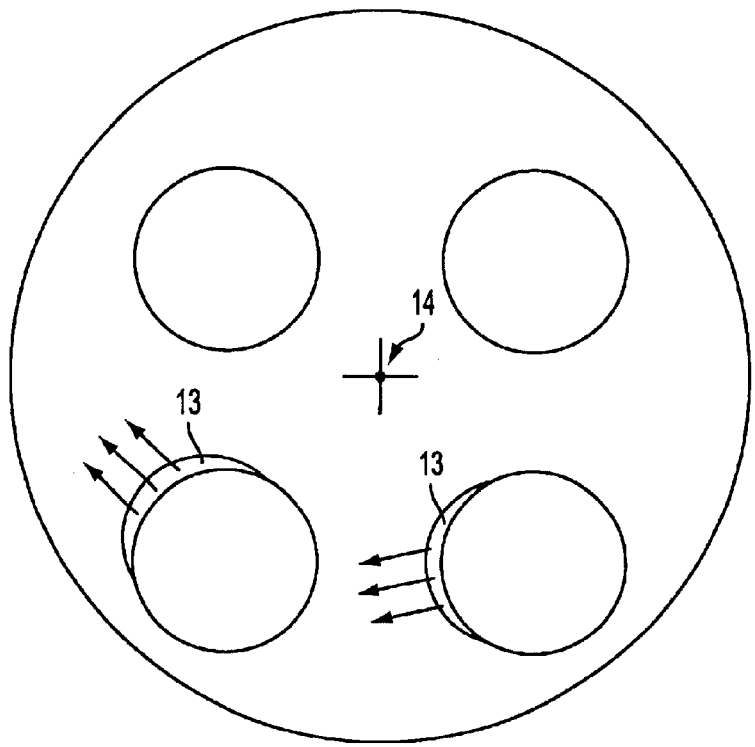
FIG. 9 A schematic view of the arrangement of the valve-seat rings according to FIG. 7 for generating a twisted flow.

With a piston internal combustion engine designed, for a charging change with a twisted flow, the notched out section 13 can be orientated according to FIG. 9 in such a way that it is approximately tangential to the cylinder axis 14. Depending on the engine design, it is sufficient if only one valve-seat ring has a correspondingly notched out section.

In accordance with the design shown in FIG. 10, a so-called valve screen 16 can be arranged on the valve body 15 of the gas intake valve 2. This screen is designed as a web and extends in circumferential direction over a partial top region of valve body 15.

With a minimum opening stroke, the valve screen 16 can exert considerable influence onto the orientation of the gas flowing into the combustion chamber, thus causing a deflection in circumferential direction and a twisting flow that rotates around the cylinder axis 14. If the gas intake valve is fully opened, the valve screen 16 that functions as guide means for the gas flow is of little importance to the gas flow.

Depending on the mode of operation of a piston internal combustion engine with respectively two or more gas intake valves or gas outlet valves, the valves can be actuated, respectively offset against each other, by being opened and closed in accordance with the above-described method.

What is claimed is:

1. A method of influencing the mixture formation and charge movement in the cylinders of a piston internal combustion engine, having respectively at least one gas intake valve and at least one gas outlet valve per cylinder, which are each provided with fully variable, preferably electromagnetic valve drives, said method comprising actuating the electronic valve-drives only via electrical signals from an electronic control device that is configured such that at at least one of predetermined speed ranges and for predetermined load conditions, at least some of the gas intake valves and gas outlet valves are moved, respectively in dependence on the piston stroke, with a changeable stroke course, relative to the opening and closing moments, the opening time, the opening width, the opening duration and the movement speed of the valve.

2. A method according to claim 1, wherein the stroke course shows a lower movement speed at at least one of the start and the end of the opening time as compared to the opening movement during the full-load operation.

3. A method according to claim 1 wherein at at least one of the start and the end of the opening time, the stroke course has a reduced opening width during a portion of the opening time as compared to the full opening.

4. A method according to claim 1 wherein for piston internal combustion engines with at least one of two gas intake valves and two gas outlet valves per cylinder, one of the two gas intake valves or one of the two gas outlet valves is moved with a normal stroke course while another gas intake valve or gas outlet valve is opened only briefly during the intake stroke and with a smaller opening width.

5. A method according to claim 4, wherein for piston internal combustion engines with at least one of two gas intake valves and two gas outlet valves per cylinder, at least one of the two gas intake valves and gas outlet valves is alternately opened fully while another gas intake valve or gas outlet valve is only opened partially during successive operating cycles.

6. A method according to claim 1, wherein the intake flow is influenced via guide means in at least one of the valve-seat area and on the valve plate by controlling the stroke course.

7. A method of influencing the mixture formation and charge movement in the cylinders of a piston internal combustion engine, having at least one gas intake valve and at least one gas outlet valve per cylinder, which are each provided with a fully variable, electromagnetic valve drive that comprises a closing magnet and an opening magnet that are disposed at spaced positions relative to one another, and an armature operatively connected to a respective valve and arranged to be moveable back and forth between the closing and opening magnets counter to the restoring force of an opening spring and a closing spring; said method comprising: actuating the movement of a valve only via electric signals from an electronic control device in dependence on the piston stroke and according to at least one of a predetermined range of rpm of the engine and predetermined load conditions, with regard to at least one of one the opening and closing times of the valve, the opening duration of the valve, the opening width of the valve, and the speed of the armature.

8. A method according to claim 7, wherein the stroke course shows a lower movement speed at at least one of the start and the end of the opening time as compared to the opening movement during the full-load operation.

9. A method according to claim 7, wherein at at least one of the start and the end of the opening time, the stroke course has a reduced opening width during a portion of the opening time as compared to the full opening.

10. A method according to claim 7, wherein for piston internal combustion engines with at least one of two gas intake valves and two gas outlet valves per cylinder, one of the two gas intake valves or one of the two gas outlet valves is moved with a normal stroke course while another gas intake valve or gas outlet valve is opened only briefly during the intake stroke and with a smaller opening width.

11. A method according to claim 10, wherein for piston internal combustion engines with at least one of two gas intake valves and two gas outlet valves per cylinder, at least one of the two gas intake valves and gas outlet valves is alternately opened fully while another gas intake valve or gas outlet valve is only opened partially during successive operating cycles.

12. A method according to claim 7, wherein the intake flow is influenced via guide means in at least one of the valve-seat area and on the valve plate by controlling the stroke course.

* * * * *